United States Patent
Nagasaku et al.

(10) Patent No.: US 7,740,285 B2
(45) Date of Patent: Jun. 22, 2010

(54) THREADED JOINT FOR STEEL PIPES

(75) Inventors: Shigeo Nagasaku, Nishinomiya (JP); Kunio Goto, Kobe (JP); Shigeo Onishi, Osaka (JP); Hiroaki Ikegami, Nishinomiya (JP)

(73) Assignees: Sumitomo Metal Industries, Ltd., Tokyo (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 12/073,077

(22) Filed: Feb. 29, 2008

(65) Prior Publication Data

US 2008/0217916 A1    Sep. 11, 2008

Related U.S. Application Data

(63) Continuation of application No. PCT/JP2006/317802, filed on Sep. 1, 2006.

(30) Foreign Application Priority Data

Sep. 2, 2005    (JP)    ............... 2005-255657

(51) Int. Cl.
*F16L 15/00*    (2006.01)
*B32B 15/01*    (2006.01)
*C21D 8/10*    (2006.01)

(52) U.S. Cl. .................. 285/94; 285/333; 285/334; 428/646; 148/519; 148/532; 148/537

(58) Field of Classification Search ............ 285/94, 285/333, 334; 428/646; 148/519, 532, 537
See application file for complete search history.

(56) References Cited

U.S. PATENT DOCUMENTS

| 4,513,995 | A | * | 4/1985 | Niehaus et al. ............... 285/55 |
| 4,872,914 | A | * | 10/1989 | Howard ...................... 106/285 |
| 5,039,576 | A | * | 8/1991 | Wilson ........................ 428/626 |
| 5,445,896 | A | * | 8/1995 | Tanaka et al. ............... 428/647 |
| 5,616,424 | A | * | 4/1997 | Carey et al. ................. 428/647 |
| 6,080,497 | A | * | 6/2000 | Carey et al. ................. 428/647 |
| 6,371,224 | B1 | * | 4/2002 | Freeman et al. ............. 175/323 |
| 6,649,282 | B1 | * | 11/2003 | Yamaguchi et al. ......... 428/648 |
| 6,861,159 | B2 | * | 3/2005 | Carey et al. ................. 428/647 |
| 2002/0086178 | A1 | * | 7/2002 | Isacsson et al. ............. 428/642 |

(Continued)

FOREIGN PATENT DOCUMENTS

JP    62-287083    12/1987

(Continued)

*Primary Examiner*—James M Hewitt
(74) *Attorney, Agent, or Firm*—Clark & Brody

(57) ABSTRACT

A threaded joint for steel pipes comprised of a pin (1) and a box (2) each having a threaded portion (1*a*, 2*b*) and an unthreaded contact portion (1*b*, 2*a*) exhibits adequate leakage resistance and galling resistance when used for makeup of oil country tubular goods with application of a green dope or even without any dope. The threaded joint has a first plating layer of Sn—Bi—Cu alloy plating formed on the contact surface of at least one of the pin (1) or the box (2). The first plating layer may have a second plating layer selected from Sn plating, Cu plating, and Ni plating on its lower side and at least one layer of a lubricating coating, and particularly a solid lubricating coating on its upper side.

8 Claims, 3 Drawing Sheets

U.S. PATENT DOCUMENTS

| | | | |
|---|---|---|---|
| 2002/0163085 A1* | 11/2002 | Shimokawa et al. | 257/772 |
| 2002/0197132 A1* | 12/2002 | Cruz et al. | 411/427 |
| 2003/0159764 A1* | 8/2003 | Goto | 148/519 |
| 2005/0037229 A1* | 2/2005 | Tanaka | 428/647 |
| 2008/0050611 A1* | 2/2008 | Kwok et al. | 428/636 |

FOREIGN PATENT DOCUMENTS

| | | |
|---|---|---|
| JP | 1-12995 | 3/1989 |
| JP | 2001-993664 | 4/2001 |
| JP | 2003-42353 | 2/2003 |
| JP | 2003-74763 | 3/2003 |
| JP | 2004-53013 | 2/2004 |

* cited by examiner

THREADED JOINT FOR STEEL PIPES

This application is a continuation of International Patent Application No. PCT/JP2006/317802 filed Sep. 1, 2006.

TECHNICAL FIELD

This invention relates to a threaded joint for steel pipes which has improved galling resistance and which is suitable for use in makeup of oil country tubular goods.

BACKGROUND ART

Oil country tubular goods (OCTG) used in oil fields and natural gas fields can have an overall length which sometimes reaches several thousand meters. Such long oil country tubular goods are typically assembled by connecting a great number of steel pipes having a unit length of about ten to twelve meters by means of couplings which are short tubular members. The material of which the steel pipes and couplings are formed is usually carbon steel, stainless steel, or high alloy steel, depending on the environment of use.

These steel pipes are connected by threaded engagement of a pin having a male threaded portion on its outer peripheral surface and a box having a female threaded portion on its inner peripheral surface. Typically, a pin is formed on each end of a steel pipe, and a box is formed on the interior of a coupling. The connecting part formed by a pin and a box is a threaded joint.

In the case of a threaded joint for steel pipes for which a high degree of airtightness is required, the tip of the male threaded portion of the pin and the base portion of the female threaded portion of the box each have an unthreaded metal contact portion formed thereon. By inserting one end of a steel pipe into a coupling and tightening the male threaded portion of the pin and the female threaded portion of the box until the unthreaded metal contact portions of the pin and the box are made to contact each other, a metal-to-metal seal which ensures airtightness is formed.

FIG. 9 schematically illustrates a threaded joint having this type of pin-box structure. A pin 1 has a male threaded portion 1a on its outer peripheral surface and an unthreaded metal contact portion 1b on its tip. Correspondingly, a box 2 has a female threaded portion 2a on its inner peripheral surface and an unthreaded metal contact portion 2b inwards thereof. Makeup, i.e., connection of OCTG is performed by engaging the threaded portions of the pin 1 and the box 2 with each other and tightening the threaded portions until the unthreaded metal contact portions of the pin 1 and the box 2 contact each other.

In order to carry out periodic inspection and the like, OCTG are lifted out of a well, and breakout is performed, i.e., the threaded portions of a threaded joint are loosened and the steel pipes are separated from the coupling. After the completion of inspection, makeup of the OCTG is performed again by tightening the threaded portions of the pin and the box, and they are again lowered into a well. The sliding contact surfaces of the threaded portions 1a and 2a of the pin 1 and the box 2 and the unthreaded metal contact portions 1b and 2b repeatedly experience a strong frictional force at the time of makeup and breakout of OCTG. Accordingly, if a threaded joint does not have sufficient resistance to frictional forces, incomplete sealing (poor resistance to leakage) and galling (unrepairable severe seizure) occur in the threaded portions 1a and 2a and particularly in the unthreaded metal contact portions 1b and 2b when tightening and loosening are repeatedly carried out.

Therefore, threaded joints for steel pipes for use in makeup of OCTG are required to be able to (a) resist tensile forces in the axial direction due to the weight of connected steel pipes, (b) resist pressure from internal and external fluids, and (c) maintain good leakage resistance and galling resistance when they are repeatedly used (undergo repeated makeup and breakout) at least four times in the case of casing (large diameter pipes) and at least ten times in the case of tubing (small diameter pipes). In recent years, there has been a trend for the depth of oil wells to become deeper and deeper, and the frequency of use of OCTG in severe conditions such as in polar regions is increasing, so increasingly strict demands are being made with respect to the quality of threaded joints.

In the past, as proposed in JP H01-12995B, for example, in order to provide the contact surface (including the surface of the threaded portions 1a, 2a and the unthreaded metal contact portions 1b, 2b) of the pin 1 or the box 2 of a threaded joint with improved galling resistance, the surface was subjected to surface treatment such as copper plating or phosphate treatment, and a compound grease (also referred to as dope) containing heavy metals such as Pb was applied to the treated surface for lubrication.

Today, however, in view of the prevention of global environmental pollution which is becoming an urgent problem, the use of dope containing Pb is being restricted. Dope which does not contain heavy metals such as Pb, Zn, and Cu (referred to as green dope) has been developed and is being used, but its lubricating performance is inadequate, and the occurrence of galling cannot be prevented particularly when a threaded joint is made of a material which is relatively susceptible to galling such as stainless steel or high alloy steel.

Other methods of improving leakage resistance and galling resistance which have been proposed include (1) a method in which a fluororesin powder is dispersed in a plating layer, (2) a method in which a lubricating protective coating is formed by sputtering, and (3) a method using a solid lubricating coating instead of compound grease, but none of these methods has achieved sufficient leakage resistance and galling resistance.

DISCLOSURE OF THE INVENTION

The object of this invention is to provide a threaded joint for steel pipes which can exhibit sufficient leakage resistance and galling resistance when used with a green dope or without any dope.

A threaded joint for steel pipes according to the present invention comprises a pin and a box each having contact surface including a threaded portion and an unthreaded metal contact portion, characterized by having a first plating layer formed from Sn—Bi alloy plating or Sn—Bi—Cu alloy plating on at least a part of the contact surface of at least one of the pin and the box.

Bi (bismuth) is known as material having low friction. It has been found that when Bi is alloyed with Sn (tin), Bi has the effect of improving the low temperature brittleness of Sn known as tin pest and the effect of greatly improving galling resistance at the time of repeated makeup and breakout of OCTG using threaded joints. Due to the effect of Bi on improving the low temperature brittleness of Sn, a Sn—Bi alloy exhibits a tin pest-preventing effect so that Sn no longer turns into a powder due to α transformation at low temperatures. A Sn—Bi—Cu alloy is slightly harder compared to a Sn—Bi alloy, but addition of Cu to a Sn—Bi alloy provides the advantages that not only is the tin pest-preventing effect obtained, but wear resistance is also increased.

The content of Bi in the Sn—Bi alloy and in the Sn—Bi—Cu alloy is preferably in the range of 0.5-10 mass % and more preferably 1-5 mass %. The Cu content in the Sn—Bi—Cu alloy is preferably in the range of 2-15 mass % and more preferably 5-10 mass %. The remainder of these alloys is generally Sn and impurities, but it is also possible for the alloys to further contain Zn and/or Pb in an amount of up to 5 mass % for each.

A threaded joint for steel pipes according to the present invention may have a second plating layer formed from Sn plating, Cu plating, or Ni plating between the first plating layer and the contact surface of the threaded joint. When this second plating layer is formed underneath the first plating layer, galling can be prevented sufficiently even if the first plating layer of a Sn—Bi or Sn—Bi—Cu alloy formed atop the second plating layer is relatively thin.

Galling resistance can be further increased by forming at least one layer of lubricating coating on the first plating layer. The lubricating coating can be a single layer of a viscous liquid or semisolid lubricating coating, or it can be a single layer of a solid lubricating coating. In another embodiment, the lubricating coating has a lower layer of a solid lubricating coating and an upper layer of a viscous liquid or semisolid lubricating coating.

A solid lubricating coating preferably contains a solid lubricating powder in a binder in order to increase the lubricating properties of the coating. By the pressure applied during repeated makeup and breakout of an OCTG, the solid lubricating powder becomes embedded in the first plating layer of a Sn—Bi alloy or Sn—Bi—Cu alloy. The amount of the solid lubricating powder which is embedded increases in proportion to the pressure and the number of times that makeup and breakout are performed. Therefore, even if the pressure becomes high or the threaded joint is repeatedly used, a lubricating effect is maintained by the embedded solid lubricating powder, and the effect of preventing galling by a threaded joint according to the present invention is increased.

The effect of improving galling resistance by a solid lubricating powder embedded in the first plating layer can be accomplished in a similar manner when the lubricating coating is a viscous liquid or semisolid coating which contains a solid lubricating powder.

When a solid lubricating coating containing a solid lubricating powder is formed directly on the surface of a base metal, since the base metal is too hard, the solid lubricating powder easily peels off without being embedded in the base metal at the time of makeup and breakout, so the above-described effect cannot be achieved.

A threaded joint for steel pipes according to the present invention has improved leakage resistance and galling resistance over conventional products, and it exhibits adequate leakage resistance and galling resistance without using compound grease, which has many problems from an environmental standpoint. Accordingly, the occurrence of galling can be effectively suppressed either application of a green dope or without any dope.

BEST MODE FOR CARRYING OUT THE INVENTION

The present invention will be explained below with respect to various embodiments while referring to the accompanying drawings. In the following explanation, unless otherwise specified, "%" means "mass %".

Figure 9:
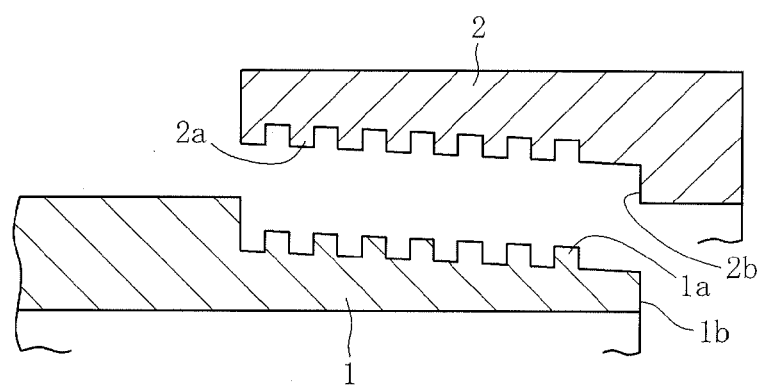
FIG. 9 is a schematic cross-sectional view of a pin and a box of a typical threaded joint for steel pipes.

Similarly to a conventional threaded joint for steel pipes shown in FIG. 9, a threaded joint for steel pipes according to the present invention is constituted by a pin having a male threaded portion and an unthreaded metal contact portion on its outer peripheral surface and a box having a female threaded portion and an unthreaded metal contact portion on its inner peripheral surface. The surfaces of the threaded portions and the unthreaded metal contact portions of the pin and the box are the contact surfaces which contact each other during makeup of OCTG by tightening the threaded portions. In the present invention, at least a part of the contact surface of at least one of the pin and the box has a first plating layer of Sn—Bi alloy plating or Sn—Bi—Cu alloy plating formed thereon. In some embodiments of the present invention, a second plating layer selected from Sn plating, Cu plating, and Ni plating is formed between the first plating layer and the base metal, and/or at least one layer of a lubricating coating is provided atop the first plating layer.

Typically, a pin is formed on both ends of a steel pipe, and a box is formed on the interior of a coupling, which is a short member separate from the steel pipe. Other threaded joints called integral threaded joints are known and used in which a pin is formed on one end of a steel pipe and a box is formed on the other end so that steel pipes are connected to each other without using a coupling. In principle, a threaded joint in which a pin is formed on the outer peripheral surface of a coupling and a box is formed on the inner peripheral surface of both ends of a steel pipe is also conceivable. The present invention can be applied to any of these types of threaded joints.

The effects of the present invention can be achieved when a first plating layer according to the present invention and optionally a second plating layer and/or a lubricating coating are provided on the contact surface of only one of a pin and a box. For example, with a typical threaded joint having a pin on both ends of a steel pipe, treatment according to the present invention may be performed only on the contact surface of the box, which is easier to treat. In this case, the contact surface of the remaining member, box in this case, may be untreated (remain as machined), or it may be subjected to an appropriate conventional lubricating treatment.

Nonlimiting examples of materials which can be used to form a threaded joint for steel pipes according to the present invention and accordingly a steel pipe and coupling are carbon steel, stainless steel, and high alloy steel. Prior to subjecting to plating according to the present invention, the contact surface of a threaded joint may undergo surface roughening by sand blasting, shot blasting, or other method.

FIGS. 1-6 each schematically show the cross section of the contact surface of a pin or a box of a threaded joint according to different embodiments of the present invention in which at least one layer formed by surface treatment and including a first plating layer is formed on the contact surface.

Figure 1:
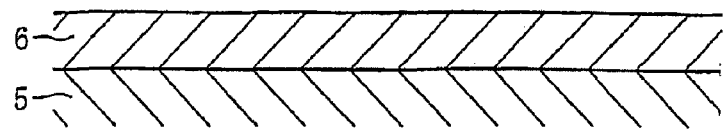
FIG. 1 is a schematic cross-sectional view of the contact surface of a threaded joint for steel pipes according to a first embodiment of the present invention.

In the threaded joint shown in FIG. 1, the contact surface of a base metal 5 of a pin or a box has only a first plating layer 6 formed thereon by Sn—Bi alloy plating or Sn—Bi—Cu alloy plating. The first plating layer may be formed by both Sn—Bi alloy plating and Sn—Bi—Cu plating.

It is usually preferred that the thickness of the first plating layer 6 be in the range of 3-30 μm and more preferably 5-25 μm. When a second plating layer which is described later is not formed underneath the first plating layer, the first layer preferably has a larger thickness in the above-mentioned range, for example, between 10 and 30 μm. On the other hand, when the second plating layer is formed, and/or a solid lubricating coating which is also described later is formed, the thickness of the first plating layer may be as thin as 15 μM or less. In this case, the thickness of the first plating layer is preferably in the range of 3-20 μm and more preferably 5-15 μm.

Sn—Bi alloy plating can be performed according to electrotinning (electroplating with Sn) using an alkaline plating solution or an acidic plating solution, for example. When a Bi compound is added to a Sn compound in the plating solution so as to form Sn—Bi alloy plating in which Bi is coprecipitated with Sn, the hardness of the resulting plated coating is greatly increased compared to that of pure Sn plating (Hv: 8-10). For example, a plated coating of Sn—Bi alloy containing 0.5%-10% of Bi has a hardness which is 2-3 times as high as that of pure Sn plating, and hence it has an increased wear resistance. At the same time, the low temperature brittleness (Sn pest) of Sn plating is improved by coprecipitation of Bi.

Similarly, Sn—Bi—Cu alloy plating can be formed by carrying out electroplating using a plating solution containing a Bi compound and a Cu compound in addition to a Sn compound. Sn—Bi—Cu alloy plating provides the above-described effects of Bi, and it has a higher plating hardness, so its wear resistance is even higher.

An example of an alkaline plating solution for Sn—Bi alloy plating contains 100-110 g/L of potassium stannate, 35-60 g/L of potassium hydroxide, and 0.5-1.5 g/L as Bi metal of a Bi compound. Typical plating conditions with this plating solution are a bath temperature of 75-85° C. and a current density of 0.5-3 A/dm$^2$.

An example of an acidic plating solution for Sn—Bi alloy plating contains 130 g/L of an organic acid, 10 g/L as Sn metal of a Sn compound, and 3 g/L as Bi metal of a Bi compound. Typical plating conditions with this plating solution are a bath temperature of 30-40° C. and a current density of 0.3-3.5 A/dm$^2$.

An example of an acidic plating solution for Sn—Bi—Cu alloy plating contains 130-180 g/L of an organic acid, 15 g/L as Sn metal of a Sn compound, 1.5 g/L as Bi metal of a Bi compound, and 1 g/L as Cu metal of a Cu compound. Typical plating conditions with this plating solution are a bath temperature of 15-30° C. and a current density of 0.5-3.5 A/dm$^2$.

For each of these plating solutions, the source for each metal can be selected from suitable compounds of the metal which are soluble in the plating solution.

Figure 2:
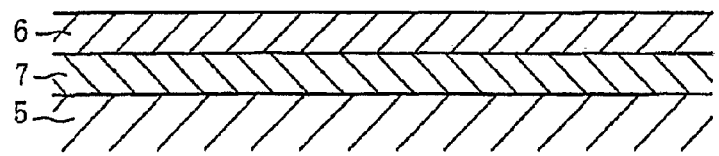
FIG. 2 is a schematic cross-sectional view of the contact surface of a threaded joint for steel pipes according to a second embodiment of the present invention.

In the threaded joint for steel pipes shown in FIG. 2, a second plating layer 7 of Sn plating, Cu plating, or Ni plating is formed as an underplating layer on the surface of a base metal 5, and a first plating layer 6 of Sn—Bi alloy plating or Sn—Bi—Cu alloy plating is formed atop the second plating layer 7. The second plating layer may also be formed by two or more plating (such as Ni plating and Cu plating layer).

The thickness of the second plating layer 7 is preferably 1-15 μm and more preferably 2-10 μm in the case of Sn plating or 1-15 μm and more preferably 1-μm in the case of Ni or Cu plating.

Sn plating may be formed, for example, using a plating solution which contains 200 g/L of stannous fluoroborate, 125 g/L of fluoroboric acid, 25 g/L of boric acid, 2 g/L of gelatin, and 1 g/L of β-naphthol, by performing electroplating at a bath temperature of 20-25° C. and a current density of 1-5 A/dm$^2$. Sn plating is typically carried out such a fluoroborate bath, but taking into consideration ease of waste water treatment, a commercially available Sn plating solution based on an organic sulfonate may also be used.

Cu plating and Ni plating can be carried out by conventional Ni or Cu electroplating method. Electroplating baths useful for Cu plating include a copper cyanide bath, a copper sulfate bath, and a copper pyrophosphate bath. Of these, a copper cyanide bath and a copper sulfate bath are preferred. Electroplating baths useful for Ni plating include a watts nickel bath, a nickel chloride bath, a nickel sulfamate bath, and an ammonium chloride bath (low temperature nickel plating bath). Of these, a watts nickel bath and a nickel chloride bath are preferred.

In the embodiment shown in FIG. 1, the first layer 6 of a Sn—Bi alloy or a Sn—Bi—Cu alloy is formed on the contact surface of a threaded joint. In the embodiment shown in FIG. 2, the second plating layer 7 of Sn, Cu, or Ni plating is initially formed on the contact surface and then the first plating layer 6 is formed.

When the base metal 5 is carbon steel, it is possible to form the first plating layer 6 (FIG. 1) or the second plating layer 7 (FIG. 2) with good adhesion even if it is directly formed on the steel surface.

On the other hand, in the case where the base metal 5 is stainless steel or high alloy steel, if the first plating layer of Sn—Bi plating or Sn—Bi—Cu plating is directly formed on the steel surface, the resulting plated coating has poor adhesion on the surface and is liable to peel off easily. Therefore, the contact surface of the threaded joint is preferably subjected to Cu or Ni strike plating before plating with Sn—Bi alloy plating or Sn—Bi—Cu alloy plating to form the first plating layer. In this case, the first plating layer with good adhesion can be formed on the contact surface via the strike plating.

Similarly, when the second plating layer 7 is initially formed on the contact surface as shown in FIG. 2, if the base metal 5 is stainless steel or high alloy steel, it is preferable to previously carry out Ni or Cu strike plating. However, in the case where the second plating layer is a thin Ni or Cu plating layer, for example, on the order of 1-3 μm, it is possible to form the second plating layer with good adhesion on the surface of stainless steel or high alloy steel even if previous strike plating is omitted.

Ni or Cu strike plating can be carried out in a conventional manner. Generally, Ni strike plating is conducted using a nickel chloride bath, while Cu strike plating is performed using a copper cyanide bath. In either case, plating time is short enough to form a plated coating of less than 1 μm and preferably at most 0.5 μm.

Figure 3:
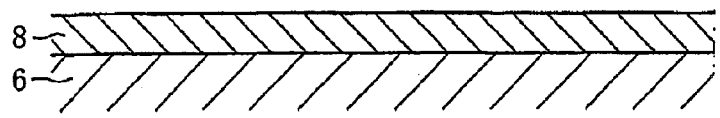
FIG. 3 is a schematic cross-sectional view of the contact surface of a threaded joint for steel pipes according to a third embodiment of the present invention.
Figure 4:
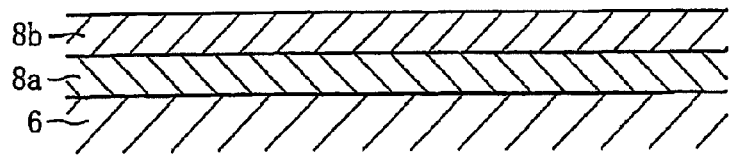
FIG. 4 is a schematic cross-sectional view of the contact surface of a threaded joint for steel pipes according to a fourth embodiment of the present invention.

In the threaded joint for steel pipes shown in FIG. 3, the surface of the first plating layer 6 of Sn—Bi alloy plating or Sn—Bi—Cu alloy is covered with a lubricating coating 8. In FIG. 3 and FIG. 4, the structure beneath the first plated layer 6 is not shown but may be the same as in either FIG. 1 or FIG. 2.

Examples of the lubricating coating are a solid lubricating coating such as that described in JP 2001-65751A, JP 2002-221288A, JP 2002-327875A, or JP 2002-348587A (a baked coating comprising a solid lubricating powder dispersed in a binder), or a viscous liquid or semisolid coating such as that described in JP 2002-173692A or JP 2004-53013A (a coating comprising various lubricating components in a base oil).

Examples of a preferred solid lubricating powder which is present in the solid lubricating coating include, but not limited to, graphite, $MoS_2$ (molybdenum disulfide), $WS_2$ (tungsten disulfide), BN (boron nitride), PTFE (polytetrafluoroethylene), CF (carbon fluoride), and $CaCO_3$ (calcium carbonate). Of these, graphite and $MoS_2$ are more preferred. These have a layered crystalline structure having a high intraplane bonding strength and a low inter-plane bonding strength, and they are liable to cause delamination of crystal planes which provides a sliding effect and thus are suitable for improving galling resistance.

As the binder which is used to form the solid lubricating coating, various materials capable of forming an organic or inorganic film may be used. Examples of a material capable of forming an organic film are organic resins having good heat resistance such as epoxy resins, polyimide resins, and polyimide-amide resins. Examples of a material capable of forming an inorganic film are organic or inorganic substances such as silica sol, alkoxysilanes, and titanium alkoxides which can form a metal oxide coating.

A solid lubricating coating can be formed by mixing a solid lubricating powder with a binder solution to form a coating composition, applying the coating composition to the contact surface of a threaded joint for steel pipes, and drying the coating preferably by heating to bake the coating. The heating temperature depends on the type of binder, and when the binder is an epoxy resin, it is preferably around 150-250° C. A preferred solid lubricating coating has a coating thickness of 5-30 μm and contains 10%-50% of a solid lubricating powder. The Sn—Bi alloy or Sn—Bi—Cu alloy plating which is the plating layer contacting the solid lubricating coating has good affinity for liquids, so the solid lubricating coating formed on this plating has good adhesion.

The viscous liquid or semisolid lubricating coating preferably does not contain a substantial amount of powder of heavy metals such as Pb, Zn, and Cu which are harmful to the environment and to humans. Such lubricating coating comprises a considerable amount of one or more lubricating components (such as waxes, metal soaps, and various types of basic metal salts of an organic acid including basic Ca or Ba sulfonates, phenate, salicylate, and carboxylate) in a base oil (such as mineral oil, a higher fatty acid ester or grease). The form of the lubricating coating, i.e., whether it is a viscous liquid or semisolid depends on the viscosity of the base oil and the amount of the lubricating components. A preferred thickness of the viscous liquid or semisolid coating is 10-200 μm.

FIG. 4 shows an embodiment in which lubricating coating consists of a lower layer in the form of a solid lubricating coating 8a and an upper layer in the form of a viscous liquid or semisolid lubricating coating 8b. The lower solid lubricating coating and the higher viscous liquid or semisolid lubricating coating constituting the two layers 8a and 8b, respectively, may be the same as described above.

Figure 5:
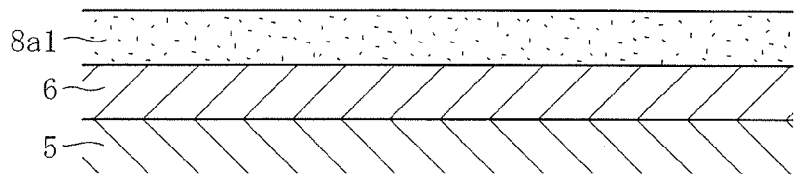
FIG. 5 is a schematic cross-sectional view of the contact surface of a threaded joint for steel pipes according to a fifth embodiment of the present invention.

FIG. 5 illustrates an embodiment in which a first plating layer 6 of Sn—Bi alloy plating or Sn—Bi—Cu alloy plating is formed on the surface of a base metal 5, and a $MoS_2$-containing solid lubricating coating 8a1 is formed atop the first plating layer 6. The $MoS_2$-containing solid lubricating coating 8a1 can be formed as described above by applying a coating composition comprising $MoS_2$ powder dispersed in a binder such as an epoxy resin followed by baking. The coating thickness is preferably around 3-30 μm for the first plating layer 6 and around 5-μm for the solid lubricating coating, with the total thickness of the two layers being around 10-45 μm.

Figure 6:
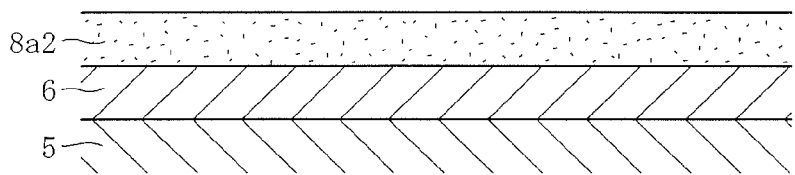
FIG. 6 is a schematic cross-sectional view of the contact surface of a threaded joint for steel pipes according to a sixth embodiment of the present invention.

FIG. 6 illustrates an embodiment which is the same as the one shown in FIG. 5 except that the solid lubricating coating is a graphite-containing solid lubricating coating 8a2.

When a solid lubricating coating is formed atop a first plating layer 6 of a Sn—Bi or Sn—Bi—Cu alloy as shown in FIG. 5 and FIG. 6, it may be preferable to form an unillustrated thin Cu plating layer with a thickness of 1-3 μm as a lower second plating layer. When such a thin Cu plating layer is formed underneath the first plating layer 6, due to the heat at the time of baking of the solid lubricating coating 8a1 or 8a2 (which is generally carried out at 150-250° C.), a layer of a Sn—Bi—Cu intermetallic compound is formed with a gentle concentration gradient between the first plating layer 6 and the base metal 5, whereby the adhesive strength of the first plating layer 6 is increased.

It is possible to form one or more of the first and second plating layers and strike plating layer by electroless plating or vapor phase plating instead of by electroplating. However, electroplating is preferred because of its efficiency and economy.

A threaded joint for steel pipes according to the present invention is preferably used for makeup of OCTG without application of dope or after application of a green dope. Particularly a threaded joint having a solid lubricating coating 8a, 8a1 or 8a2 formed on a first plating layer 6 of a Sn—Bi or Sn—Bi—Cu alloy as shown in FIG. 4 to FIG. 6 exhibits very high lubricating properties due to the ability of the solid lubricating powder in the lubricating coating to be embedded under pressure in the first plating layer which is relatively soft, and it provides good galling resistance even if it is used for makeup of OCTG without application of dope. When a viscous liquid or semisolid lubricating coating is formed atop the solid lubricating coating, galling resistance is further increased. Similarly, when only a viscous liquid or semisolid lubricating coating is formed atop the first plating layer, if it contains lubricating solid (e.g., an alkaline earth metal carbonate which is contained in a basic metal salt of an organic acid), the above-described improvement in lubrication and galling resistance due to the ability of the solid particles to be embedded in the first plating layer can be achieved.

In the case of a threaded joint according to the present invention as shown in FIG. 1 or FIG. 2 in which no lubricating coating is formed so that the first plating layer of a Sn—Bi or Sn—Bi—Cu alloy is exposed, it is generally preferable to use the threaded joint for makeup of OCTG after application of green dope.

Dope is generally a semisolid or solid composition containing one or more thickeners and optionally other solid particles dispersed in lubricating oil. Useful thickeners include metal soaps, Ca complexes, urea derivatives, metal salts, and bentonite derivatives. A kind of dope which is substantially free from heavy metal powder and has good biodegradability is referred to as green dope. Although there is no specific definition of green dope, as a rough standard, green dope should have a BOD value of at least 60%. Green dope is distinguishable in terms of biodegradability from a semisolid lubricating coating which may be formed atop the first plating layer according to the present invention. The consistency of a dope is measured by the penetration defined in JIS K 2220 5.3 in the same manner as that of grease. A viscous liquid lubricating coating has a much lower consistency, which can be measured by a standard viscometer such as a Brookfield viscometer. Its viscosity is generally at most 10,000 cSt at 40° C.

EXAMPLES

The following examples are intended to demonstrate the effects of the present invention, but not intended to limit the present invention in any manner. In the examples, the contact surface including the threaded portion and the unthreaded metal contact portion of a pin will be referred to as the "pin surface", and the contact surface including the threaded portion and the unthreaded metal contact portion of a box will be referred to as the "box surface".

Threaded joints for steel pipes which were prepared in the examples were constituted by a pin formed on each end of a seamless steel pipe for testing which measured an outer diameter of 244.5 mm, a wall thickness of 13.84 mm, and a length of 1200 mm, and a box formed on the interior of a coupling. Each pin had a male threaded portion and an unthreaded metal contact portion formed on its outer peripheral surface, and each box had a female threaded portion and an unthreaded metal contact portion formed on its inner peripheral surface. The steel pipe and coupling were made of 13 Cr steel, which is a high alloy steel containing 13% Cr, 0.1% Ni, and 0.04% Mo.

As shown in Table 1 and Table 2, at least one layer of plating and optionally at least one lubricating coating atop the plating were formed on the box surface of each coupling. Table 1 illustrates working examples according to the present invention in which no lubricating coating was formed in Examples 1-8 and one or two lubricating coatings were formed in Examples 9-13. Table 2 illustrates comparative examples in which the uppermost plating layer was not a Sn—Bi or Sn—Bi—Cu alloy plating layer.

The Sn—Bi alloy plating and the Sn—Bi—Cu alloy plating shown in Table 1 were formed by electroplating using the above-described acidic plating solution (using the respective metal sources in the form of an organic acid salt). The alloy composition of these alloy plating was approximately 3% Bi for the Si—Bi alloy plating and approximately 3% Bi and approximately 7.5% Cu for the Sn—Bi—Cu alloy plating. The Sn—Cu alloy plating used in some comparative examples was formed by electroplating using an alkaline plating solution. The Cu content of the Sn—Cu alloy plating was approximately 50%.

When a second plating layer was formed before the first layer, it was formed by electroplating. The electroplating bath used was a sulfonate bath for Sn plating, a nickel chloride bath for Ni plating, and a copper cyanide bath for Cu plating.

Although not shown in Tables 1 and 2, each box surface which was degreased was previously subjected to Ni strike plating with a thickness of 0.5 μm using a nickel chloride bath for strike plating before the lowermost plating layer indicated in the tables was formed, in view of the base metal which was high alloy steel. However, in Examples 4 and 13 and Comparative Examples 1-3 and 5-7 in which the lowermost plating layer was a Ni plating layer with a thickness of 1 μm, Ni strike plating was not carried out.

The lubricating coatings used in the examples were a solid lubricating coatings and a viscous liquid lubricating coating. The solid lubricating coating contained a lubricating powder (graphite or molybdenum disulfide) in an epoxy resin and was formed by application of a coating composition followed by baking at a temperature of approximately 200° C. The content of the lubricating powder in the solid lubricating coatings was 30% in the case of graphite and 40% in the case of molybdenum disulfide ($MoS_2$).

The viscous liquid lubricating coating contained wax and a basic calcium sulfonate as lubricating components in a mineral oil as a base oil.

The threaded joints having box surfaces treated in the manner shown in Tables 1 and 2 were subjected to the following galling test.

(Galling Test)

A pin on the end of a steel pipe was inserted into the box of a coupling. The pin surface had previously been blasted with glass beads. In some examples, a commercially available green dope had previously been applied to the box surface. To simulate makeup and breakout of OCTG, the threaded portions of the pin and the box were engaged and tightened with a torque of 49351.8 N-m (36400 ft-lbs) at room temperature until the unthreaded metal contact portions of the pin and the box contacted each other for makeup, and then they were disengaged to disconnect the steel pipe from the coupling for breakout. Then, the box surface was visually observed to determine whether galling occurred or not.

This procedure of makeup and breakout was performed up to ten times, and galling resistance was evaluated by the cycle of makeup and breakout until the occurrence of galling (unrepairable severe seizure). When slight repairable seizure was observed, the test was continued after repair of the threaded joint. The results are shown in Tables 1 and 2.

TABLE 1

| Example | Structure of box surface (in the order from the upper to lower layer) (the value in the parentheses is coating thickness) | Application of green dope | Results of galling test (number of makeup and breakout cycles before occurrence of galling) |
|---|---|---|---|
| Example 1 | Sn—Bi alloy plating (15 μm) | Yes | 8 times |
|  |  | No | 6 times |
| Example 2 | Sn—Bi alloy plating (12 μm); Sn Plating (5 μm) | Yes | 10 times |
|  |  | No | 8 times |
| Example 3 | Sn—Bi alloy plating (14 μm); Cu plating (3 μm) | Yes | 10 times |
| Example 4 | Sn—Bi alloy plating (25 μm); Ni plating (1 μm) | Yes | 10 times |
| Example 5 | Sn—Bi—Cu alloy plating (12 μm) | Yes | 8 times |

TABLE 1-continued

| Example | Structure of box surface (in the order from the upper to lower layer) (the value in the parentheses is coating thickness) | Application of green dope | Results of galling test (number of makeup and breakout cycles before occurrence of galling) |
|---|---|---|---|
| Example 6 | Sn—Bi—Cu alloy plating (10 μm); Sn plating (10 μm) | Yes | 10 times |
| Example 7 | Sn—Bi—Cu alloy plating (15 μm); Cu plating (5 μm) | Yes | 10 times |
| Example 8 | Sn—Bi—Cu alloy plating (15 μm); Ni plating (5 μm) | Yes | 10 times |
| Example 9 | graphite-containing solid lubricating coating (30 μm); Sn—Bi alloy plating (5 μm) | No | 8 times |
| Example 10 | graphite-containing solid lubricating coating (30 μm); Sn—Bi alloy plating (11 μm); Sn plating (3 μm) | No | 8 times |
| Example 11 | viscous liquid lubricating coating (200 μm); graphite-containing solid lubricating coating (10 μm); Sn—Bi alloy plating (10 μm) | No | 10 times |
| Example 12 | viscous liquid lubricating coating (200 μm); graphite-containing solid lubricating coating (10 μm); Sn—Bi alloy plating (10 μm); Sn plating (5 μm) | No | 10 times |
| Example 13 | viscous liquid lubricating coating (200 μm); graphite-containing solid lubricating coating (10 μm); Sn—Bi alloy plating (10 μm); Cu-plating (5 μm); Ni plating (1 μm) | No | 10 times |

TABLE 2

| Comparative Example | Structure of box surface (in the order from the upper to lower layer) (the value in the parentheses is coating thickness) | Application of green dope | Results of galling test (number of makeup and breakout cycles before occurrence of galling) |
|---|---|---|---|
| Comparative Example 1 | Cu plating (10 μm); Ni plating (1 μm) | Yes No | 4 times 1 time |
| Comparative Example 2 | graphite-containing solid lubricating coating (25 μm); Cu plating (10 μm); Ni plating (1 μm) | Yes No | 4 times 1 time |
| Comparative Example 3 | MoS$_2$-containing solid lubricating coating (25 μm); Cu plating (10 μm); Ni plating (1 μm) | Yes | 4 times |
| Comparative Example 4 | Cu—Sn plating (10 μm) | Yes | 6 times |
| Comparative Example 5 | Cu plating (8 μm); Ni plating (1 μm) | No | 2 times |
| Comparative Example 6 | graphite-containing solid lubricating coating (25 μm); Cu plating (8 μm); Ni plating (1 μm) | No | 2 times |
| Comparative Example 7 | MoS$_2$-cantaining solid lubricating coating (25 μm); Cu plating (9 μm); Ni plating (1 μm) | No | 2 times |
| Comparative Example 8 | graphite-containing solid lubricating coating (25 μm); Cu—Sn plating (12 μm) | No | 3 times |

Example 1

The box surface had a Sn—Bi alloy plating layer with a thickness of 15 μM. In the galling test which was carried out after green dope was applied to the box surface, makeup and breakout could be carried out eight times without the occurrence of galling. When the same box surface was subjected to the galling test without application of green dope, makeup and breakout could be carried out six times without the occurrence of galling.

Example 2

The box surface had a lower Sn plating layer with a thickness of 5 μm and an upper Sn—Bi alloy plating layer with a thickness of 12 μm. In the galling test which was carried out after green dope was applied to the box surface, makeup and breakout could be carried out ten times without the occurrence of galling. When the same box surface was subjected to the galling test without application of green dope, makeup and breakout could be carried out eight times without the occurrence of galling.

Example 3

The box surface had a lower Cu plating layer with a thickness of 3 μm and an upper Sn—Bi alloy plating layer with a thickness of 14 μm. In the galling test which was carried out after green dope was applied to the box surface, makeup and breakout could be carried out ten times without the occurrence of galling.

Example 4

The box surface had a lower Ni plating layer with a thickness of 1 μm and an upper Sn—Bi alloy plating layer with a thickness of 25 μm. In the galling test which was carried out after green dope was applied to the box surface, makeup and breakout could be carried out ten times without the occurrence of galling.

Example 5

The box surface had a Sn—Bi—Cu alloy plating layer with a thickness of 12 μm. In the galling test which was carried out after green dope was applied to the box surface, makeup and breakout could be carried out eight times without the occurrence of galling.

Example 6

The box surface had a lower Sn plating layer with a thickness of 10 μm and an upper Sn—Bi—Cu alloy plating layer with a thickness of 10 μm. In the galling test which was carried out after green dope was applied to the box surface, makeup and breakout could be carried out ten times without the occurrence of galling.

Example 7

The box surface had a lower Cu plating layer with a thickness of 5 μm and an upper Sn—Bi—Cu alloy plating layer with a thickness of 15 μm. In the galling test which was carried out after green dope was applied to the box surface, makeup and breakout could be carried out ten times without the occurrence of galling.

Example 8

The box surface had a lower Ni plating layer with a thickness of 5 μm and an upper Sn—Bi—Cu alloy plating layer with a thickness of 15 μm. In the galling test which was carried out after green dope was applied to the box surface, makeup and breakout could be carried out ten times without the occurrence of galling.

Example 9

The box surface had a Sn—Bi alloy plating layer with a thickness of 5 μm and a graphite-containing solid lubricating coating with a thickness of 30 μm formed on the plating layer. In the galling test which was carried out without application of green dope, makeup and breakout could be carried out eight times without the occurrence of galling.

Example 10

The box surface had a lower Sn plating layer with a thickness of 3 μm and an upper Sn—Bi alloy plating layer with a thickness of 11 μm, and a graphite-containing solid lubricating coating with a thickness of 30 μm formed atop the plating layers. In the galling test which was carried out without application of green dope, makeup and breakout could be carried out eight times without the occurrence of galling.

Example 11

The box surface had a Sn—Bi alloy plating layer with a thickness of 10 μm, and a lower graphite-containing solid lubricating coating with a thickness of 10 μm and an upper viscous liquid lubricating coating with a thickness of 200 μm formed on the plating layer. In the galling test which was carried out without application of green dope, makeup and breakout could be carried out ten times without the occurrence of galling.

Example 12

The box surface had a lower Sn plating layer with a thickness of 5 μm and an upper Sn—Bi alloy plating layer with a thickness of 10 μm, and a lower graphite-containing solid lubricating coating with a thickness of 10 μm and an upper viscous liquid lubricating coating with a thickness of 200 μm formed on the plating layers. In the galling test which was carried out without application of green dope, makeup and breakout could be carried out ten times without the occurrence of galling.

Example 13

The box surface had a lowermost Ni plating layer with a thickness of 1 μm, an intermediate Cu plating layer with a thickness of 5 μm, and an upper Sn—Bi alloy plating layer with a thickness of 10 μm, and a lower graphite-containing solid lubricating coating with a thickness of 10 μm and an upper viscous liquid lubricating coating with a thickness of 200 μm formed on the plating layers. In the galling test which was carried out without application of green dope, makeup and breakout could be carried out ten times without the occurrence of galling.

Comparative Example 1

The box surface had a lower Ni plating layer with a thickness of 1 μm and an upper Cu plating layer with a thickness of 10 μm. In the galling test which was, carried out after green dope was applied to the box surface, galling occurred on the fourth cycle of makeup and breakout. When the same box surface was subjected to the galling test without application of green dope, galling occurred on the first cycle.

Comparative Example 2

The box surface had a lower Ni plating layer with a thickness of 1 μm and an upper Cu plating layer with a thickness of 10 μm, and a graphite-containing solid lubricating coating with a thickness of 25 μm formed atop the plating layers. In the galling test which was carried out after green dope was applied to the box surface, galling occurred on the fourth cycle of makeup and breakout. When the same box surface was subjected to the galling test without application of green dope, galling occurred on the first cycle.

Comparative Example 3

The box surface had a lower Ni plating layer with a thickness of 1 μm and an upper Cu plating layer with a thickness of 10 μm, and a $MoS_2$-containing solid lubricating coating with a thickness of 25 μm formed atop the plating layers. In the galling test which was carried out after green dope was applied to the box surface, galling occurred on the fourth cycle of makeup and breakout.

Comparative Example 4

The box surface had a Sn—Cu alloy plating layer with a thickness of 10 μm. In the galling test which was carried out after green dope was applied to the box surface, galling occurred on the sixth cycle of makeup and breakout.

Comparative Example 5

The box surface had a lower Ni plating layer with a thickness of 1 μm and an upper Cu plating layer with a thickness of 8 μm. In the galling test which was carried out without application of green dope, galling occurred on the second cycle of makeup and breakout.

Comparative Example 6

The box surface had a lower Ni plating layer with a thickness of 1 μm and an upper Cu plating layer with a thickness of 8 μm, and a graphite-containing solid lubricating coating with a thickness of 25 μm formed atop the plating layers. In the galling test which was carried out without application of green dope, galling occurred on the second cycle of makeup and breakout.

Comparative Example 7

The box surface had a lower Ni plating layer with a thickness of 1 μm and an upper Cu plating layer with a thickness of 9 μm, and a $MoS_2$-containing solid lubricating coating with a thickness of 25 μm formed atop the plating layers. In the galling test which was carried out without application of green dope, galling occurred on the second cycle of makeup and breakout.

Comparative Example 8

The box surface had a Sn—Cu alloy plating layer with a thickness of 12 μm and a graphite-containing solid lubricating coating with a thickness of 25 μm formed atop the plating layer. In the galling test which was carried out without application of green dope, galling occurred on the third cycle of makeup and breakout.

From the results for the above-described examples and comparative examples, it can be seen that a threaded joint for steel pipes according to the present invention was clearly more effective at suppressing galling than were the comparative examples.

(Difference in Affinity)

Figure 7:
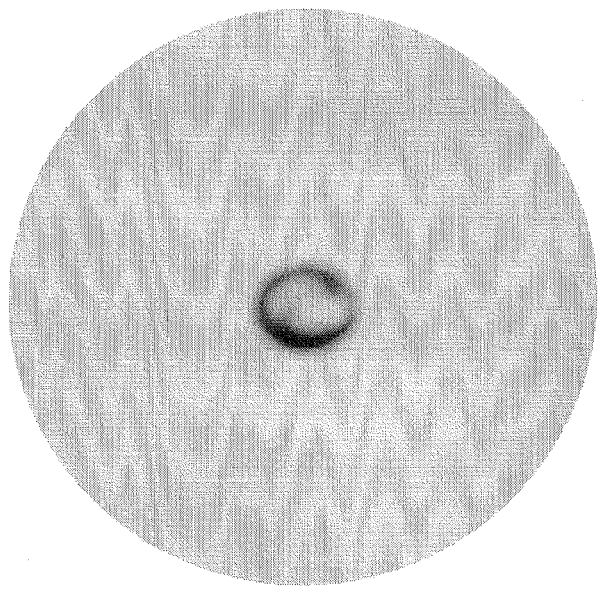
FIG. 7 is a photograph showing the degree of wettability of a Cu plated surface.
Figure 8:
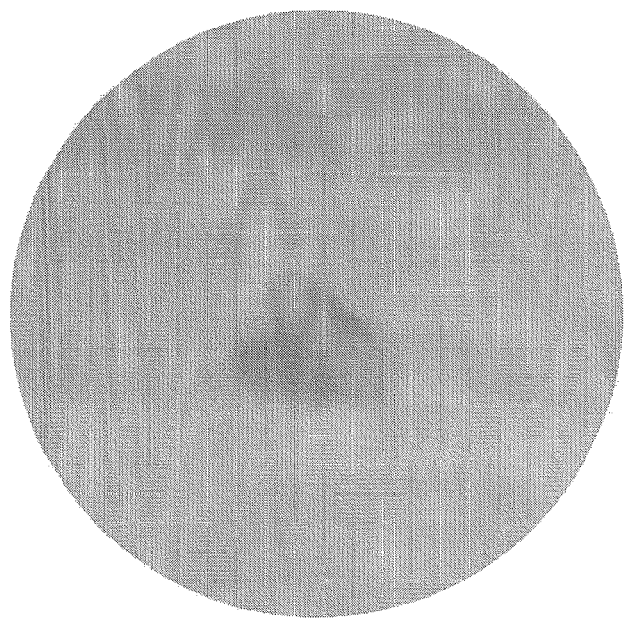
FIG. 8 is a photograph showing the degree of wettability of a Sn—Bi alloy-plated surface.

The difference in the affinity (wettability) between a Cu plating coating and a Sn—Bi alloy plating coating was investigated. FIGS. 7 and 8 are photographs which show the state of spreading of a liquid (water) when one drop of the liquid was placed on the surface of a Cu plating coating (FIG. 7) and a Sn—Bi alloy plating coating (FIG. 8) formed in the examples. The amount of spreading indicates the wettability of the surfaces, i.e., their affinity for the liquid. The liquid spread more on the Sn—Bi alloy plating coating than on the Cu plating coating, indicating that the Sn—Bi alloy plating had a larger affinity for the liquid.

The difference in affinity was actually reflected in the galling test results. Examples 9-12, which had a graphite-containing solid lubricating coating formed atop a Sn—Bi alloy plating coating, had far superior galling resistance to Comparative Examples 2 and 6, which had the same solid lubricating coating formed atop a Cu plating coating. One reasons for this difference in galling resistance is thought to be that the affinity and therefore the adhesion of the solid lubricating coating to the plating layer was higher for the Sn—Bi alloy plating coating than for the Cu plating coating.

The invention claimed is:

1. A pin of a threaded joint for steel pipes having a contact surface including a threaded portion and an unthreaded metal contact portion, characterized by having a first plating layer as an Sn—Bi—Cu alloy plating layer formed on at least a part of the contact surface and having a second plating layer formed beneath the first plating layer, the second plating layer being an electroplating layer selected from the group consisting of Sn plating, Cu plating, and Ni plating.

2. A box of a threaded joint for steel pipes having a contact surface including a threaded portion and an unthreaded metal contact portion, characterized by having a first plating layer as an Sn—Bi—Cu alloy plating layer formed on at least a part of the contact surface and having a second plating layer formed beneath the first plating layer, the second plating layer being an electroplating layer selected from the group consisting of Sn plating, Cu plating, and Ni plating.

3. A threaded joint for steel pipes comprised of a pin and a box each having a contact surface including a threaded portion and an unthreaded metal contact portion, characterized by having a first plating layer as an Sn—Bi—Cu alloy plating formed on at least a part of the contact surface of at least one of the pin and the box, and further having a second electroplating layer selected from the group consisting of Sn plating, Cu plating, and Ni plating beneath the first plating layer.

4. A threaded joint for steel pipes according to claim 3 having at least one layer of a lubricating coating on the surface of the first plating layer.

5. A threaded joint for steel pipes according to claim 4 wherein the lubricating coating comprises a single layer of a lubricating coating selected from the group consisting of a viscous liquid lubricating coating, a semisolid lubricating coating, and a solid lubricating coating.

6. A threaded joint for steel pipes according to claim 5 wherein the solid lubricating coating contains a solid lubricating powder.

7. A threaded joint for steel pipes according to claim 4 wherein the lubricating coating comprises a lower layer of a solid lubricating coating and an upper layer of a viscous liquid lubricating coating or semisolid lubricating coating.

8. A threaded joint for steel pipes according to claim 7 wherein the solid lubricating coating contains a solid lubricating powder.

* * * * *